(12) United States Patent
Henze

(10) Patent No.: US 11,220,590 B2
(45) Date of Patent: Jan. 11, 2022

(54) PREPARATION HAVING A LOW PHENOL CONTENT ON THE BASIS OF THERMOPLASTIC POLYURETHANE

(71) Applicant: BASF SE, Ludwigshafen (DE)

(72) Inventor: Oliver Steffen Henze, Lemfoerde (DE)

(73) Assignee: BASF SE, Ludwigshafen (DE)

( * ) Notice: Subject to any disclaimer, the term of this patent is extended or adjusted under 35 U.S.C. 154(b) by 0 days.

(21) Appl. No.: 15/310,574

(22) PCT Filed: May 13, 2015

(86) PCT No.: PCT/EP2015/060597
§ 371 (c)(1),
(2) Date: Nov. 11, 2016

(87) PCT Pub. No.: WO2015/121504
PCT Pub. Date: Aug. 20, 2015

(65) Prior Publication Data
US 2017/0096546 A1    Apr. 6, 2017

(30) Foreign Application Priority Data

May 13, 2014 (EP) .................................. 14168153

(51) Int. Cl.
| | |
|---|---|
| *C08K 5/3492* | (2006.01) |
| *C08G 18/76* | (2006.01) |
| *C08G 18/48* | (2006.01) |
| *C08G 18/32* | (2006.01) |
| *C08K 5/42* | (2006.01) |
| *C08K 3/22* | (2006.01) |
| *C08K 5/092* | (2006.01) |
| *C08G 18/66* | (2006.01) |
| *C08K 5/00* | (2006.01) |
| *C08K 5/521* | (2006.01) |
| *C08K 5/21* | (2006.01) |
| *C08K 5/523* | (2006.01) |
| *C08L 67/00* | (2006.01) |
| *C08L 75/08* | (2006.01) |
| *C09K 21/10* | (2006.01) |
| *C09K 21/12* | (2006.01) |

(52) U.S. Cl.
CPC ...... *C08K 5/34924* (2013.01); *C08G 18/3206* (2013.01); *C08G 18/4854* (2013.01); *C08G 18/6674* (2013.01); *C08G 18/7664* (2013.01); *C08G 18/7671* (2013.01); *C08K 3/22* (2013.01); *C08K 5/0066* (2013.01); *C08K 5/092* (2013.01); *C08K 5/21* (2013.01); *C08K 5/34922* (2013.01); *C08K 5/42* (2013.01); *C08K 5/521* (2013.01); *C08K 5/523* (2013.01); *C08L 67/00* (2013.01); *C08L 75/08* (2013.01); *C09K 21/10* (2013.01); *C09K 21/12* (2013.01); *C08K 2003/2206* (2013.01); *C08L 2201/02* (2013.01)

(58) Field of Classification Search
CPC .... C08K 5/34924; C08K 5/523; C08K 21/12; C08K 5/34922; C08K 3/22; C08K 5/092; C08K 5/42; C08K 2003/2206; C08K 5/0066; C08K 5/521; C08L 67/00; C08L 75/08; C08L 2201/02; C09K 21/10; C09K 21/12; C08G 18/4854; C08G 18/7664; C08G 18/3206; C08G 18/6674; C08G 18/7671
See application file for complete search history.

(56) References Cited

U.S. PATENT DOCUMENTS

| | | | | |
|---|---|---|---|---|
| 3,987,012 | A * | 10/1976 | Statton .................. | C08G 18/10 528/75 |
| 6,518,359 | B1 * | 2/2003 | Clemens ............ | C08G 18/0823 428/355 N |
| 2005/0203244 | A1 | 9/2005 | Hackl et al. | |
| 2010/0324183 | A1 | 12/2010 | Henze et al. | |
| 2012/0041119 | A1 * | 2/2012 | Chen .................. | C08G 18/4238 524/311 |
| 2015/0166769 | A1 * | 6/2015 | Henze .................. | C09K 21/12 524/127 |

FOREIGN PATENT DOCUMENTS

| | | |
|---|---|---|
| EP | 0 617 079 A2 | 9/1994 |
| WO | WO 03/099896 A1 | 12/2003 |

(Continued)

OTHER PUBLICATIONS

International Search Report dated Aug. 5, 2015 in PCT/EP2015/060597.
English translation of the International Preliminary Reporton Patentability and Written Opinion dated Nov. 15, 2016 in PCT/EP2015/060597.

(Continued)

*Primary Examiner* — Patrick D Niland
(74) *Attorney, Agent, or Firm* — Grüneberg and Myers PLLC

(57) ABSTRACT

The invention relates to a preparation comprising A) thermoplastic polyurethane produced at least from the following starting materials: (a) isocyanate, (b) a substance which is reactive toward isocyanate and which preferably comprises (c) chain extender and/or (d) catalyst and, as other starting materials, (e) additional and/or auxiliary substances, which are either added to the thermoplastic polyurethane during the production process and thus are comprised in the thermoplastic polyurethane, where at least one of the starting materials comprises a phenoxy group or a derivative of the phenoxy group, and the phenol content of the preparation or the sum of the phenol contents of the thermoplastic polyurethane comprised in the preparation and of all of the other starting materials is less than 100 ppm by weight, and also to corresponding production processes and uses.

13 Claims, No Drawings

(56) References Cited

FOREIGN PATENT DOCUMENTS

WO    WO 2008/151894 A1    12/2008
WO    WO 2009/103765 A1    8/2009

OTHER PUBLICATIONS

"Elastollan 1185 A TPU Technical Datasheet," BASF The Chemical Company, XP055154005, Jan. 2014, 4 pages.
RDP brochure issued by ZheJiang WanSheng (issue date : unkown).

* cited by examiner

PREPARATION HAVING A LOW PHENOL CONTENT ON THE BASIS OF THERMOPLASTIC POLYURETHANE

SUBJECT MATTER OF THE INVENTION

The invention relates to a preparation comprising a thermoplastic polyurethane and in which at least one starting material, preferably a flame retardant, comprises a phenoxy group and/or a derivative of the phenoxy group.

PRIOR ART

There are known thermoplastic polyurethanes with starting materials, preferably flame retardants, which comprise a phenoxy group and/or corresponding derivatives: by way of example EP 0 617 079 B1 describes self-extinguishing thermoplastic polyurethanes, and also processes for production thereof. WO 03/099 896 relates to thermoplastic polyurethanes with low smoke generation.

Many of the starting materials used in the thermoplastic polyurethanes (TPUs), in particular flame retardants, in particular those comprising a phenoxy group and/or corresponding derivatives, evolve very high contents of phenol or of derivatives of phenol. The phenol and derivatives thereof, in particular the phenol, in the thermoplastic polyurethane lead to unpleasant odor, are highly toxic, and increase the extent of hydrolysis in particular of polyesters which are present in the TPU, preferably in the flame-retardant TPU, or that come into direct contact with the flame-retardant TPU.

PROBLEM-SOLUTION APPROACH

The problem addressed by the present invention therefore consists in providing preparations comprising thermoplastic polyurethane (TPU) with good flame retardancy, good mechanical properties, in particular low abrasion, high tensile strength, high tensile strain at break, high tear-propagation resistance, adequate low-temperature flexibility, together with good microbial resistance, little odor, low toxicity, and good hydrolysis resistance, where the hydrolysis resistance is in particular intended to be effective in situations where polyesters are present in the TPU or come into contact with the TPU.

Another problem addressed by the invention was to provide suitable processes for producing said preparations comprising the TPU, and to identify those TPUs that exhibit said advantageous properties in the preparation and that also do not lead to undesired hydrolysis in association with polyesters, and also to identify corresponding application areas.

DETAILED DESCRIPTION OF THE INVENTION

Surprisingly, it has been found that preparations which comprise starting materials that comprise at least one phenoxy group or at least one derivative of the phenoxy group, preferably at least one phenoxy group, preferably a flame retardant having phenoxy groups, and/or comprise thermoplastic polyurethane produced with starting materials that comprise at least one phenoxy group or at least one derivative of the phenoxy group, preferably at least one phenoxy group, preferably a flame retardant having phenoxy groups, advantageously solves said problem when these starting materials have only low phenol content, preferably when moreover the base number or the acid number, or the base number and the acid number, of the preparation or of the thermoplastic polyurethane and of the starting materials, does/do not exceed a particular value defined hereinafter.

The expression phenoxy group means the phenoxy radical. Derivatives of the phenoxy group are those derivatives of the phenoxy radical in which the aromatic system of the phenoxy radical has substitution by other aryl or alkyl moieties, where each substituent on the aromatic system preferably comprises from 1 to 14 carbon atoms, preferably from 1 to 7 carbon atoms, more preferably from 1 to 3 carbon atoms, and particularly preferably 1 carbon atom, and the number of substituents is 1, 2, or 3.

Preferred derivatives of the phenoxy group are the isopropylphenyl, cresyl, or xylenol group, and the corresponding radicals.

The invention therefore firstly provides a preparation 1 comprising
A) thermoplastic polyurethane produced at least from the following starting materials:
(a) isocyanate, (b) a substance which is reactive toward isocyanate and which preferably has a number-average molar mass of from 500 g/mol to $100 \times 10^3$ g/mol, and which is preferably a polyol, and also in other preferred embodiments (c) chain extender and/or (d) catalyst,
and
B) as other starting material or else other starting materials (e) additional and/or auxiliary substances, i.e. at least one additional substance and/or auxiliary substance,
which is either added to the thermoplastic polyurethane during the production process and thus is comprised in the thermoplastic polyurethane
and/or is comprised in the preparation in addition to the thermoplastic polyurethane, where at least one starting material comprises a phenoxy group and/or a derivative of the phenoxy group, preferably a phenoxy group, and the phenol content in the preparation or in another preferred embodiment the sum of the phenol content of the thermoplastic polyurethane comprised in the preparation and of all of the starting materials is less than 100 ppm by weight, preferably less than 50 ppm by weight, more preferably less than 20 ppm by weight, and particularly preferably less than 10 ppm by weight.

The invention further provides a process for the production of said preparation and of preferred embodiments thereof, where the starting materials are processed at temperatures of from 160° C. to 250° C. to give the preparation. The invention also provides an extruded, powder-sintered, and/or injection-molded part produced from the preparation of the invention, and the use of said part for applications in which the part comprises polyester and/or is in direct contact with a polyester.

The advantages of the preparation of the invention and of the corresponding production processes are that, in comparison with conventional materials, the preparation comprises reduced phenol contents and/or reduced contents of phenol derivatives, with associated lower odor level which is in particular relevant in indoor spaces, very particularly in vehicles. Another factor associated with lower phenol content and/or reduced content of phenol derivatives, preferably reduced phenol content, is moreover reduced toxicity. The preparations of the invention comprising thermoplastic polyurethane moreover have improved hydrolysis resistance, and this gives them a not inconsiderable advantage in particular in preparations which comprise polyesters and/or in preparations which are in contact with polyesters. These advantages are surprisingly prominent in the preferred embodiments, where mechanical properties comparable with those of conventional materials are present together with very good flame retardancy.

Flame retardancy is determined by the UL 94V test (ISBN 0-7629-0082-2, UL 94, Standard for Tests for Flammability of Plastic Materials for Parts in Devices and Appliances, Fifth Edition, Oct. 29, 1996, 20 mm Vertical Burning Test; V-0, V-1, or V-2). A particularly decisive factor for the evaluation of flame retardancy is the classification determined in the UL 94V vertical test. Preference is given to those preparations for which the result in the UL 94V test is at least V-2, more preferably V-0, preferably at thicknesses of 3.2 mm, preferably of 1.5 mm, very particularly preferably at a thickness of 0.75 mm.

Thermoplastic polyurethanes that are used in the preparations of the invention are in principle known. They are produced via reaction of (a) isocyanate with (b) a compound reactive toward isocyanate, preferably with a number-average molar mass of from $0.5 \times 10^3$ g/mol to $100 \times 10^3$ g/mol which is preferably a polyol and, in preferred embodiments, (c) chain extenders, preferably with a molar mass of $0.05 \times 10^3$ g/mol to $0.499 \times 10^3$ g/mol in other preferred embodiments in the presence of (d) catalysts and/or conventional (e) auxiliary substances and/or additional substances.

Another term used for the components isocyanate (a), compounds (b) reactive toward isocyanates, preferably polyol, and also chain extenders (c), individually or in combination, is structural components.

Another term used for the structural components together with the catalyst (d) and/or the auxiliary substances and/or additional substances (e), i.e. all of the materials added to the preparation, is starting materials. The expression starting materials comprises not only the materials that are used for the production of the thermoplastic polyurethane but also the materials that are added to the thermoplastic polyurethane during the production process but that do not react to give the, or with the, thermoplastic polyurethane, but are comprised therein. All of the materials which are present alongside the thermoplastic polyurethane in the preparation or are added to the thermoplastic polyurethane during the production of the preparation are moreover starting materials.

Preferred embodiments of the preparation use respectively only one starting material of one type alongside other starting materials of another type, e.g. only one isocyanate, only one additional substance, etc.; other preferred embodiments use respectively a plurality of starting materials of the same type, i.e. a plurality of isocyanates, a plurality of additional substances, etc., alongside other starting materials, and in turn other preferred embodiments use only one preferred embodiment at least of one starting material and at least two different preferred embodiments at least of a second starting material. The invention comprises all conceivable combinations.

Hardness and melt index of the TPUs are adjusted by varying the molar ratios of quantities used of structural components (b) and (c), where hardness and melt viscosity rise with an increasing content of chain extender (c), while melt index decreases.

Flexible thermoplastic polyurethanes, e.g. those with Shore A hardness below 95, preferably from 95 to 75 Shore A, more preferably from 94 to 85 Shore A, can preferably be produced by using the in essence difunctional substances (b) which are reactive toward isocyanates and which preferably have a molar mass of from 500 g/mol to $100 \times 10^3$ g/mol, preferably polyols, and chain extenders (c) in molar ratios that are advantageously from 1:1 to 1:5, preferably from 1:1.5 to 1:4.5, so that the resultant mixtures of structural components (b) and (c) have a hydroxy equivalent weight above 200, and in particular of from 230 to 450, whereas the molar ratios of (b) to (c) for the production of TPUs of greater rigidity, e.g. those with Shore A hardness above 95, preferably from 55 Shore D to 85 Shore D, are in range from 1:5.5 to 1:15, preferably from 1:6 to 1:12, so that the resultant mixtures of (b) and (c) have a hydroxy equivalent weight of from 110 to 200, preferably from 120 to 180.

The TPUs for the preparation of the invention are produced by reactive structural components (a) and (b), and also in a preferred embodiment (c), in preferred embodiments in the presence of the catalyst (d) and in other preferred embodiments in the presence of the auxiliary and/or additional substances (e) in quantities such that the equivalents ratio of NCO groups of the diisocyanates (a) to the entirety of the hydroxy groups of components (b) and (c) is from 0.95 to 1.10:1, preferably from 0.98 to 1.08:1, and in particular about 1.0 to 1.05:1.

It is preferable in accordance with the invention to produce preparations in which the TPU has a weight-average molar mass of at least $0.1 \times 10^6$ g/mol, preferably of at least $0.2 \times 10^6$ g/mol, and in particular greater than $0.3 \times 10^6$ g/mol. The upper limit for the weight-average molar mass of the TPUs is determined via the processability and also the desired property profile; the weight-average molar mass of the TPUs in the preparation is preferably not above $0.8 \times 10^6$ g/mol. The weight-average molar masses stated above for the TPU, and also for structural components (a) and (b) are the weight averages determined by means of gel permeation chromatography (GPC) as in example 15.

The number-average molar masses stated in the specification are, however, determined as in example 16.

Organic isocyanates (a) used for the thermoplastic polyurethane in the preparation are preferably aliphatic, cycloaliphatic, araliphatic, and/or aromatic isocyanates which preferably comprise two isocyanate groups, more preferably tri-, tetra-, penta-, hexa-, hepta-, and/or octamethylene diisocyanate, 2-methylpentamethylene 1,5-diisocyanate, 2-ethylbutylene 1,4-diisocyanate, pentamethylene 1,5-diisocyanate, butylene 1,4-diisocyanate, 1-isocyanato-3,3,5-trimethyl-5-isocyanatomethylcyclohexane (isophorone diisocyanate, IPDI), 1,4-bis(isocyanatomethyl)cyclohexane, and/or 1,3-bis(isocyanatomethyl)cyclohexane (HXDI), paraphenylene 2,4-diisocyanate (PPDI), tetramethylenexylene 2,4-diisocyanate (TMXDI), hexamethylene 1,6-diisocyanate (HDI), cyclohexane 1,4-diisocyanate, 1-methylcyclohexane 2,4- and/or 2,6-diisocyanate, and/or dicyclohexylmethane 4,4'-, 2,4'-, and 2,2'-diisocyanate (H12 MDI), diphenylmethane 2,2'-, 2,4'-, and/or 4,4'-diisocyanate (MDI), naphthylene 1,5-diisocyanate (NDI), tolylene 2,4- and/or 2,6-diisocyanate (TDI), diphenylmethane diisocyanate, dimethyldiphenyl 3,3'-diisocyanate, 1,2-diphenylethane diisocyanate, and/or phenylene diisocyanate. Preference is further given to selection of the isocyanate (a) from hexamethylene 1,6-diisocyanate (HDI), the mixture of dicyclohexylmethane 4,4'-, 2,4'-, and 2,2'-diisocyanate (H12 MDI), and/or the mixture of diphenylmethane 4,4'-, 2,4'-, and 2,2'-diisocyanate (MDI). It is particularly preferable to use diphenylmethane 4,4'-diisocyanate (MDI).

In one preferred embodiment there is one isocyanate present, preferably one of the isocyanates mentioned as preferred above; in another preferred embodiment a plurality are present, preferably a mixture of the isocyanates mentioned as preferred above.

Preferred compounds (b) reactive toward isocyanates are those with a molar mass (Mn) of from 500 g/mol to $8 \times 10^3$ g/mol, preferably from $0.6 \times 10^3$ g/mol to $5 \times 10^3$ g/mol, in particular from $0.8\times10^3$ g/mol to $3\times10^3$ g/mol. It is further preferable that these are polycarbonates, polyesterols, or polyetherols, another collective term for these being "polyols"; preference is further given to polycarbonates and polyetherols, and particular preference is given to polyetherols, further preference being given to those based on ethylene oxide, propylene oxide, and/or butylene oxide, very particular preference being given to polytetrahydrofuran (PTHF).

It is preferable that the compounds (b) reactive toward isocyanates, these preferably being polyols described above, have an average functionality of from 1.8 to 2.3, preferably of from 1.9 to 2.2, in particular 2, and it is further preferable that they have only primary hydroxy groups.

One preferred embodiment uses, as compounds (b) reactive toward isocyanates, at least one polycarbonatediol, preferably an aliphatic polycarbonatediol. Polycarbonatediols to which preference is further given are polycarbonatediols based on alkanediols. Particularly suitable polycarbonatediols are strictly difunctional OH-functional polycarbonatediols, preferably strictly difunctional OH-functional aliphatic polycarbonatediols. Suitable polycarbonatediols are preferably based on butanediol, pentanediol, or hexanediol, in particular 1,4-butanediol, 1,5-pentanediol, 1,6-hexanediol, 3-methylpentane-(1,5)-diol, or a mixture thereof, particular preference being given to 1,4-butanediol, 1,5-pentanediol, 1,6-hexanediol, or a mixture thereof.

It is preferable to use polycarbonatediols based on butanediol and hexanediol, polycarbonatediols based on pentanediol and hexanediol, polycarbonatediols based on hexanediol, and mixtures of two or more of these polycarbonatediols.

It is preferable that the polycarbonatediols used have a number-average molar mass (Mn) in the range from 500 g/mol to $4.0\times10^3$ g/mol, determined by way of GPC, preferably in the range from $0.65\times10^3$ g/mol to $3.5\times10^3$ g/mol, determined by way of GPC, particularly preferably in the range from $0.8\times10^3$ g/mol to $3.0\times10^3$ g/mol, determined by way of GPC.

Preferred chain extenders (c) used are aliphatic, araliphatic, aromatic, and/or cycloaliphatic compounds with a molar mass of from 50 g/mol to 499 g/mol, preferably having 2 bonded systems reactive toward isocyanate, which are also described as functional groups. Preferred chains extenders are diamines and/or alkanediols, preference being further given to alkanediols having from 2 to 10 carbon atoms, preferably having from 3 to 8 carbon atoms in the alkylene moiety, i.e. di-, tri-, tetra-, penta-, hexa-, hepta-, octa-, nona-, and/or decaalkylene glycols, which with further preference have only primary hydroxy groups. Particular preference is given to ethylene 1,2-glycol, 1,3-propanediol, 1,4-butanediol, and 1,6-hexanediol; preference is further given to 1,4-butanediol. Another preferred embodiment also uses a mixture of the chain extenders.

Preferred embodiments use catalysts (d) with the structural components. Catalysts are in particular those which accelerate the reaction between the NCO groups of the isocyanates (a) and the hydroxy groups of the compound (b) reactive toward isocyanates, and the chain extender (c) if this is used. Preferred catalysts are tertiary amines, in particular triethylamine, dimethylcyclohexylamine, N-methylmorpholine, N,N'-dimethylpiperazine, 2-(dimethylaminoethoxy)ethanol, diazabicyclo[2.2.2]octane. In another preferred embodiment the catalysts are organic metal compounds such as titanic esters, iron compounds, preferably iron(III) acetylacetonate, tin compounds, preferably those of carboxylic acids, particularly preferably tin diacetate, tin dioctoate, tin dilaurate, or the dialkyltin salts, preference being further given to dibutyltin diacetate, dibutyltin dilaurate, or bismuth salts of carboxylic acid, preferably bismuth decanoate and/or bismuth(III) neodecanoate.

Particularly preferred catalysts are: tin dioctoate and/or bismuth(III) neodecanoate, which are preferably also used individually.

Preferred quantities used of the catalysts (d) are from 0.0001 to 0.1 part by weight per 100 parts by weight of the compound (b) reactive toward isocyanates. It is preferable to use tin catalysts and/or bismuth salts of carboxylic acids, in particular tin dioctoate and/or bismuth(III) neodecanoate, which are preferably also used individually.

It is also possible to add conventional additional substances and/or conventional auxiliary substances (e) as starting materials, alongside catalysts (d), to structural components (a) to (c) during the production of the thermoplastic TPU. Examples that may be mentioned are surface-active substances, fillers, flame retardants, nucleating agents, lubricants and mold-release aids, dyes and pigments, optionally stabilizers, preferably in relation to hydrolysis, light, heat, oxidation, or discoloration, inorganic and/or organic fillers, and preferably also polymers, preferably polyolefins, polyester, polyamide, polyoxymethylene, polystyrene, and/or styrene copolymers, reinforcing agents, and/or plasticizers.

For the purposes of the present invention, stabilizers are additives, also described as auxiliary substances and/or additional substances, which protect the thermoplastic polyurethane and/or the preparation from damaging environmental effects. Examples are antioxidants, preference being given to phenolic antioxidants, hindered amine light stabilizers, UV absorbers, hydrolysis stabilizers, quenchers, and flame retardants. Examples of commercial stabilizers are given in Plastics Additives Handbook, 5th edition, H. Zweifel, ed., Hanser Publishers, Munich, 2001 ([1]), pp. 98-136.

The UV absorbers in one preferred embodiment have a number-average molar mass of more than $0.3\times10^3$ g/mol, in particular more than $0.39\times10^3$ g/mol. The UV absorbers preferably used should moreover have a molar mass that is no greater than $5.0\times10^3$ g/mol, particularly preferably no greater than $2.0\times10^3$ g/mol.

A particularly suitable group of UV absorbers is that of the benzotriazoles. Examples of particularly suitable benzotriazoles are Tinuvin® 213, Tinuvin® 234, Tinuvin® 571, and also Tinuvin® 384, and Eversorb® 82. Quantities added of the UV absorbers are usually from 0.01% by weight to 5% by weight, based on the entirety of TPU, preferably from 0.1% by weight to 2.0% by weight, in particular from 0.2% by weight to 0.5% by weight.

A UV stabilization system described above based on an antioxidant and on a UV absorber is often not adequate to ensure good stability of the TPU of the invention with respect to the damaging effect of UV radiation. In that case it is also possible to add a hindered amine light stabilizer (HALS), in addition to the antioxidant and the UB absorber, to the TPU of the invention. The activity of the HALS compounds is based on their ability to form nitroxyl radicals which intervene in the mechanism of the oxidation of polymers. HALS are high-efficiency UV stabilizers for most polymers.

HALS compounds are well known and are obtainable commercially. Examples of HALS stabilizers obtainable commercially are found in Plastics Additives Handbook, 5th edition, H. Zweifel, Hanser Publishers, Munich, 2001, pp. 123-136.

Preferred hindered amine light stabilizers are those with number-average molar mass greater than $0.5 \times 10^3$ g/mol. The molar mass of the preferred HALS compounds should moreover be no greater than $10 \times 10^3$ g/mol, particularly preferably no greater than $5.0 \times 10^3$ g/mol. Particularly preferred hindered amine light stabilizers are bis(1,2,2,6,6-pentamethylpiperidyl) sebacate (Tinuvin® 765, Ciba Spezialitätenchemie AG) and the condensate of 1-hydroxyethyl-2,2,6,6-tetramethyl-4-hydroxypiperidine and succinic acid (Tinuvin® 622). Particular preference is given to the condensate of 1-hydroxyethyl-2,2,6,6-tetramethyl-4-hydroxypiperidine and succinic acid (Tinuvin® 622), when the titanium content of the finished product, based on the structural components used, is <150 ppm by weight, preferably <50 ppm by weight, particularly <10 ppm by weight.

The concentration used of HALS compounds is preferably from 0.01% by weight to 5% by weight, particularly preferably from 0.1% by weight to 1% by weight, in particular from 0.15% by weight to 0.3% by weight, based on the total weight of structural components used.

A particularly preferred UV stabilization system comprises a mixture of a phenolic stabilizer, a benzotriazole, and a HALS compound, in the preferred quantities described above.

Further details concerning the abovementioned auxiliaries and additional substances are found in the technical literature, e.g. from Plastics Additives Handbook, 5th edition, H. Zweifel, ed., Hanser Publishers, Munich, 2001.

The TPUs used in the preparation, and also in one embodiment the preparation itself, is/are preferably produced batchwise or continuously via the known processes, for example using reactive extruders or the belt process using the "one-shot" method or the prepolymer method, preferably using the "one-shot" method. In the "one-shot" method, the reacting structural components (a) isocyanates and (b) compound reactive toward isocyanate, and in preferred embodiments also the chain extender (c), the catalyst (d), and/or the other starting materials, the additional substances and/or auxiliary substances (e) are mixed with one another in succession or simultaneously, whereupon the polymerization reaction immediately begins.

In the extruder process, structural components (a) and (b), and also in preferred embodiments (c), (d), and/or (e) are also introduced into the extruder individually or as mixture and are reacted, preferably at temperatures of from 160° C. to 250° C. The resultant thermoplastic polyurethane is extruded, cooled, and pelletized. It is preferable to use a twin-screw extruder because twin-screw extruders operate with practically no pressure increase, thus permitting more precise adjustment of extruder temperature.

Preference is further given to completing the reaction of only components (a), (b), and optionally (c) in preferred embodiments in the presence of at least one catalyst (d) in a first step in the reaction mixture to give a TPU. Preference is further given here to addition of an antioxidant to the reaction mixture, preferably a phenolic antioxidant as described above. The further preference is as described above.

In preferred processes, all of the starting materials needed for the production of the TPU are reacted with one another in a first step, and in a second step the other starting materials are admixed with the preparation.

The polyurethane obtained by the processes described is cooled and pelletized, i.e. the preparation preferably takes the form of pellets which form the bases for the extruder, powder-sintered, or injection-molded parts produced therefrom.

In a preferred preparation 2, the acid number of the preparation itself, or in another embodiment the acid number of the mixture of the thermoplastic polyurethane comprised in the preparation and of all of the starting materials comprised, is smaller than 20, preferably smaller than 10, more preferably smaller than 5, and particularly preferably smaller than 2.5 in the preparation 1 explained above or in one of the preferred embodiments thereof. The overall acid number is determined as in example 3 and 4.

The preferred preparation 3 is a preparation comprising A) thermoplastic polyurethane that, as described above, has been produced at least from the following starting materials: (a) isocyanate, (b) a substance which is reactive toward isocyanate and which preferably has a number-average molar mass of from 500 g/mol to $100 \times 10^3$ g/mol, and which is preferably a polyol, and also in one preferred embodiment (c) chain extender, and/or catalyst (d), and B) as other starting materials (e) additional substances and/or auxiliary substances, which are either added to the thermoplastic polyurethane during the production process and thus are comprised in the thermoplastic polyurethane and/or are comprised in the preparation in addition to the thermoplastic polyurethane, where at least one starting material is comprised, and at least one of the starting materials comprises a phenoxy group, and the base number of the preparation or, in another preferred embodiment, the base number of the mixture of the thermoplastic polyurethane comprised in the preparation and of all of the starting materials is smaller than 2, preferably smaller than 1, more preferably smaller than 0.5, more preferably smaller than 0.3, even more preferably smaller than 0.2 and very particularly preferably, smaller than 0.15. The base number of the preparation of the thermoplastic polyurethane and of the other starting materials comprised in the preparation is determined as in example 2 and 4.

The preparation 4 to which further preference is given comprises all of the features of one of the preparations 1 to 3 or of their embodiments to which further preference is given, and the sum of the phenol contents of all of the starting materials, or in another preferred embodiment the sum of the phenol content of the TPU produced as described above and of the other starting materials of the preparation, is smaller than 100 ppm by weight, preferably smaller than 50 ppm by weight, more preferably smaller than 20 ppm by weight, and particularly preferably smaller than 10 ppm by weight.

Preference is likewise given to the following preparations: preparation 4a, which comprises all of the features of preparation 1 and preparation 3 or of one of the preferred embodiments thereof, or preparation 4b, which comprises all of the features of preparation 2 and preparation 3 or of one of the preferred embodiments thereof.

Preference is further given to preparation 5 which, in addition to the features of preparations 1 to 4 and of preferred embodiments thereof, preparations 4a and 4b also being counted with those, also comprises a phenoxy group or a derivative of the phenoxy group, preferably a phenoxy group, is present with bonding by way of an ester bond in one of the starting materials.

Preference is further given to preparation 6 which comprises all of the features of preparation 5, where the ester bond is part of an organic phosphate and/or of a phosphonate.

Preference is further given to preparation 7 which comprises all of the features of preparation 6 where the ester bond that is part of an organic phosphate and/or of a phosphonate is present in an additional substance and/or auxiliary substance (e) of the preparation, and said substance is with further preference a flame retardant.

Preference is further given to preparation 8 which comprises all of the features of one of the preparations 7 or one of the preferred embodiments thereof where the flame retardant is selected from the following group: isopropylated triphenyl phosphate (ITP), mono-, bis-, and tris(isopropylphenyl) phosphates having different degrees of isopropylation, triphenyl phosphate (TPP), tricresyl phosphate (TCP), resorcinol bis(diphenyl phosphate) (RDP), bisphenol A bis(diphenyl phosphate) (BDP), diphenyl cresyl phosphate (DPC), diphenyl 2-ethylhexyl phosphate (DPO), and/or xylenol-resorcinol (RDXP), particular preference being given to resorcinol bis(diphenyl phosphate) (RDP).

Preference is further given to preparation 9 which comprises all of the features of one of the preparations 1 to 8 and additionally comprises melamine cyanurate as additional substance.

A particularly preferred preparation 10 comprises, as thermoplastic polyurethane, the reaction product of the starting materials isocyanate dicyclohexylmethane 4,4'-, 2,4'-, and/or 2,2'-diisocyanate (MDI), particularly preferably dicyclohexylmethane 4,4'-diisocyanate (4,4'-MDI), with the polyol polytetrahydrofuran with a number-average molar mass of $1.0 \times 10^3$ g/mol, the chain extender 1,4-butanediol, and also moreover from 10% by weight to 40% by weight, from 20% to 35% by weight, preferably from 22% by weight to 28% by weight, of melamine cyanurate, and from 5% by weight to 20% by weight, preferably from 5% by weight to 10% by weight, more preferably from 7 to 8% by weight, of resorcinol bis(diphenyl) phosphate (RDP), where the base number of the preparation or of the mixture of the thermoplastic polyurethane comprised in the preparation and of all of the starting materials present is smaller than 2, preferably smaller than 1, and particularly preferably smaller than 0.5, and with further preference the acid number of the preparation or of the mixture of the thermoplastic polyurethane comprised in the preparation and of all of the starting materials present in the preparation is smaller than 20, preferably smaller than 10, more preferably smaller than 5, and particularly preferably smaller than 2.5, and more preferably the phenol content of the preparation or the sum of the phenol contents of the thermoplastic polyurethane comprised in the preparation and of all of the other starting materials is less than 100 ppm by weight, preferably less than 50 ppm by weight, more preferably less than 20 ppm by weight, and particularly preferably less than 10 ppm by weight.

In a preparation 11 to which preference is further given, which comprises all of the features of preparation 10, the ratio by weight of the input weight of polytetrahydrofuran with a number-average molar mass of $1.0 \times 10^3$ g/mol to 1,4-butanediol is moreover in the range from 10:1 to 10:1.5.

The preparation 12 to which preference is further given comprises all of the features of preparation 9, 10, or 11, or of the preferred embodiments thereof, where the melamine cyanurate comprises an excess of melamine of less than 1% by weight, preferably less than 0.5% by weight, more preferably less than 0.25% by weight, and particularly preferably less than 0.1% by weight, based on the entire quantity of melamine cyanurate used, and the excess of cyanuric acid is less than 1% by weight, preferably less than 0.5% by weight, more preferably less than 0.3% by weight, and particularly preferably less than 0.15% by weight, based on the entire quantity of melamine cyanurate used.

Another preferred preparation 13 comprises all of the features of one of the preceding preparations 1 to 12 or of the preferred embodiments thereof, where the substance reactive toward isocyanates is a polyether and/or a polycarbonate, preferably a polyether. The preparation 14 to which preference is further given, which comprises all of the features of preparation 13, comprises polytetrahydrofuran (PTHF) as polyether. In preparation 15 to which preference is further given, which comprises all of the features of preparations 14, the number-average molar mass of the polytetrahydrofuran (PTHF) is from $0.5 \times 10^3$ g/mol to $5 \times 10^3$ g/mol, preferably from $0.6 \times 10^3$ g/mol to $2.2 \times 10^3$ g/mol, more preferably from $0.8 \times 10^3$ g/mol to $1.5 \times 10^3$ g/mol, the number-average molar mass particularly preferably being $1.0 \times 10^3$ g/mol.

A preferred preparation 16 which comprises all of the features of one of the preceding preparations comprises from 35% by weight to 85% by weight of thermoplastic polyurethane, more preferably from 50% by weight to 75% by weight, and very particularly preferably from 65% by weight to 70% by weight. The weight unit % by weight is based on the total weight of the preparation.

A preferred preparation 17 which comprises all of the features of one of the preparations 1 to 16 or comprises one of the preferred embodiments thereof comprises an ester or a polyester or is in direct contact with a polyester. This preparation and the polyester directly in contact with it are also called a composite. In the composite the preparation is preferably spatially separate from the polyester. In a preferred embodiment the polyester is separate from the preparation but has at least one contact area in common with the preparation. More preferably the composite comprises layers of polyester on one hand and layers of the preparation on the other. In a particularly preferred embodiment the preparation and the polyester have been formed into two hoses, and the inside or outside of one hose is in contact with the inside or outside of the second hose.

One preferred preparation 18, which comprises all of the features of one of the preparations 1 to 17 or of the preferred embodiments thereof, has a Shore hardness of from 87-91 A and a tensile strength of at least 25 MPa.

Another preferred preparation 19 comprises all of the features of one of the preparations 1 to 18 or of one of the respectively preferred embodiments and is moreover one wherein the total water content of all of the starting materials is less than 0.1% by weight, preferably less than 0.05% by weight, and particularly preferably less than 0.02% by weight. The water content in the starting materials should already be sufficiently small to avoid undesired byproducts, chain termination, hydrolysis, or mechanical property impairment. The water content of the mixtures is determined in accordance with DIN EN ISO 15512, Method B. In order to keep the water content low in the preparations, the thermoplastic polyurethane or the preparations produced therewith is/are preferably dried for at least 20 hours at 80° C.

The Shore hardness values are determined in this invention in accordance with DIN ISO 7619-1, tensile strength being determined in accordance with DIN 53504. The phenol content is determined as in example 5.

The invention further provides a process 1 for the production of one of the preparations 1 to 20 or of one of the respectively preferred embodiments, by processing the starting materials at a temperature of from 160° C. to 250° C. to give the preparation.

Preference is further given to a process which comprises the features of process 1 where the sum of the phenol contents of the starting materials used in the preparation is less than 100 ppm by weight, preferably less than 50 ppm by weight, more preferably less than 20 ppm by weight, and particularly preferably less than 10 ppm by weight, where the content is based on the total weight of all of the starting materials in the preparation.

Preference is further given to a process 3 which comprises all of the steps of process 1 or 2 where the content of phenol in the preparation immediately after the production process is less than 100 ppm by weight, preferably less than 50 ppm by weight, more preferably less than 20 ppm by weight, and particularly preferably less than 10 ppm by weight, where the content of phenol is based on the total weight of the preparation.

The invention further provides an extruded, powder-sintered, and/or injection-molded part produced from one of preparations 1 to 20 or from one of the respectively preferred embodiments.

In an embodiment to which preference is further given, said extruded, powder-sintered, and/or injection-molded part produced from one of preparations 1 to 20 is in direct contact with a polyester.

It is preferable that said extruded, powder-sintered, and/or injection-molded parts are selected from the group of: coating, damping element, folding bellows, foil, fiber, molding, floor for buildings and transport, nonwoven textile, gasket, roll, shoe sole, hose, cable, cable plug, cable sheathing, cushion, laminate, profile, belt, saddle, foam from additional foaming of the preparation, plug connector, drag cable, solar module, cladding in automobiles, wiper blade, modifier for thermoplastic materials, i.e. substance that influences the properties of another material. Each of these uses per se is a preferred embodiment which is also termed as application. A preferred group of applications is cable, cable plug, cable sheathing. The extruded, powder-sintered, and/or injection-molded parts are, as the name implies, preferably produced via injection molding, calendering, powder sintering, or extrusion.

The invention likewise provides the use of the extruded, powder-sintered, and/or injection-molded part for applications in which the part is in direct contact with a polyester.

The examples hereinafter amplify the subject matter of the invention, but are in no way to be considered as restricting the subject matter of the invention.

EXAMPLES

Example 1

Starting Materials

TPU 1: thermoplastic polyurethane TPU of Shore hardness 85 A, based on polytetrahydrofuran polyol (PTHF) with a number-average molar mass of 1000 g/mol, 1,4-butanediol, diphenylmethane diisocyanate (MDI), phenol content <1 ppm by weight.

Melapur MC 15 ED: melamine cyanurate (1,3,5-triazine-2,4,6(1H,3H,5H)trione, compound with 1,3,5-triazine-2,4, 6-triamine (1:1)), CAS #: 37640-57-6, BASF SE, 67056 Ludwigshafen, GERMANY, particle size D99%</=50 μm, D50%<=4.5 μm, water content % (w/w)<0.2, phenol content <1 ppm by weight.

Fyrolflex RDP: resorcinol bis(diphenyl phosphate), CAS #: 125997-21-9, Supresta Netherlands B.V., Office Park De Hoef, Hoefseweg 1, 3821 AE Amersfoort, The Netherlands, viscosity at 25° C.=700 mPas, acid number <0.1 mg KOH/g, water content % (w/w)<0.1, phenol content <100 ppm by weight.

Melamine: 1,3,5-triazine-2,4,6-triamine, CAS #: 108-78-1, Sigma-Aldrich Chemie GmbH, Riedstrasse 2, D-89555 Steinheim, 99%, phenol content <1 ppm by weight.

Cyanuric acid: 1,3,5-triazine-2,4,6-triol, CAS #: 108-80-5, Sigma-Aldrich Chemie GmbH, Riedstrasse 2, D-89555 Steinheim, 98%, phenol content <1 ppm by weight.

Calcium hydroxide: CAS #: 1305-62-0, Sigma-Aldrich Chemie GmbH, Riedstrasse 2, D-89555 Steinheim p.a. >96%, phenol content <1 ppm by weight.

p-Toluenesulfonic acid: p-toluenesulfonic acid monohydrate, CAS #: 6192-52-5, Sigma-Aldrich Chemie GmbH, Riedstrasse 2, D-89555 Steinheim, >98.5%, phenol content <1 ppm by weight.

Citric acid: CAS #: 77-92-9, Sigma-Aldrich Chemie GmbH, Riedstrasse 2, D-89555 Steinheim, >99.5%, phenol content <1 ppm by weight.

Example 2

Determination of Amine Number (Also Termed Base Number)

About 1 g, precisely weighed, of the preparation or of the TPU that is used in the preparation and that comprises the starting materials (a) and (b) used for the production of the TPU, and also the starting materials (c), (d), and (e) in as far as these are used in the production of the TPU, are dissolved or suspended at 25° C. and stirred for 24 hours in 100.0 ml of DMF (solvent) in the ratio prescribed by the mixing specification with the other starting materials of the preparation, i.e. other auxiliary substances and/or additional substances (e), insofar as these are not already comprised in the TPU, these being added to the preparation only after production of the TPU. 10.0 ml of water, and also 3 droplets of bromocresyl blue, are then added (1% by weight in methanol) to the solution, and then the mixture is titrated to the endpoint with 0.1 N butanolic hydrochloric acid. The solvent with the water and the bromocresyl blue is subjected to determination in the same way, as blank test.

Example 3

Determination of Acid Number

About 1 g, precisely weighed, of the preparation or of the TPU that is used in the preparation and that comprises the starting materials (a) and (b) used for the production of the TPU, and also the starting materials (c), (d), and (e) in as far as these are used in the production of the TPU, are dissolved or suspended at 25° C. and stirred for 24 hours in 100.0 ml of DMF (solvent) in the ratio prescribed by the mixing specification with the other starting materials of the preparation, insofar as these are not already comprised in the TPU, these being added to the preparation only after production of the TPU. 10.0 ml of water, and also 3 droplets of phenolphthalein, are then added (1% by weight in methanol) to the solution.

The mixture is then titrated to the endpoint with 0.1 N ethanolic potassium hydroxide solution. The solvent with the water and the phenolphthalein is subjected to determination in the same way, as blank test.

Example 4

Calculation of the Amine Number (Base Number) and of the Acid Number

The relevant consumption data are determined. The consumption of reagent in the analysis is included as A in the calculation, and the consumption in the blank test as B.

E=input weight in [g]

$$\text{Acid number} = (5.6 \times (A-B))/E$$

$$\text{Amine number} = (5.6 \times (A-B))/E$$

Detailed derivation of the calculation formula:

$$(56 \text{ [mg/mmol]} \times 0.1 \text{ [mmol/ml]} \times (A \text{ [ml]} - B \text{ [ml]}))/E \text{ [g]}$$

Both amine number and acid number are stated in mg KOH/g.

Example 5

Determination of Phenol Content

The method is based on an analysis method of the Verband der deutschen Automobilindustrie [Association of the German automobile industry] (VDA 278), but was optimized for rapid phenol detection. The phenol (and other volatile substances) are evaporated from the polymer by means of thermodesorption (60 min at 120° C./helium stream—in accordance with VDA 278 FOG conditions), and collected by cryofocusing. This is followed by gas-chromatographic separation and detection of the phenol by means of mass spectrometer. The quantities are determined by using the gas chromatogram, and phenol, dissolved in methanol, was used as external standard here.

Example 6

Determination of Water Content

The water content of the mixtures was determined in accordance with DIN EN ISO 15512 Method B. Water is not a stated starting material for the preparation, but is comprised in the starting materials. It is desirable to minimize the content in the preparation.

Example 7

Production of the Preparations Comprising TPU 1

The tables below list compositions in which the TPU 1 used and the starting materials are stated in parts by weight (pw). Each of the homogeneous mixtures was produced by using a ZE 40 A twin-screw extruder from Berstorff with screw length 35 D divided into 10 barrel sections.

The design of the extrusion process here was such that the TPU was first melted via suitable kneading and mixing agents, and then the additional starting materials were added to the TPU melt.

The throughput was in each case 30 kg/h. The extruder rotation rate was 160 rpm. The zone temperatures were Z1 199° C., Z2 199° C., Z3 207° C., Z4 190° C., Z5 187° C., Z6 190° C., Z7 189° C., Z8 190° C., Z9 190° C., Z10 194° C., perforated plate 195° C.

To determine the amine number or acid number, and the phenol content, the pellet of the perforation was used after underwater pelletization that followed the extrusion process and after drying at 80° C. for 20 h.

Example 8

| Material (*= inventive) | 1* | 2* | 3* | 4* |
|---|---|---|---|---|
| Amine number of the mixture of the TPU and of the starting materials | 0.4 | 0.4 | 0.4 | 0.4 |
| Amine number of the preparation | 0.4 | 0.4 | 0.4 | 0.4 |
| Water content of the TPU and of the mixture of all of the starting materials in % by weight | 0.01 | 0.1 | 0.18 | 0.66 |
| TPU 1 | 67.50 | 67.50 | 67.50 | 67.50 |
| Melamine cyanurate 15 ED | 25.00 | 25.00 | 25.00 | 25.00 |
| Fyrolflex RDP | 7.50 | 7.50 | 7.50 | 7.50 |
| Phenol content [ppm by weight] of dried preparation | 8 | 8 | 8 | 9 |

It was shown that phenol contents of less than 10 ppm are obtained with amine numbers less than 0.5. Nor do high water contents increase the phenol content significantly.

Example 9

Melamine

| Material (*= inventive) | 5* | 6* | 7* | 8* | 9* |
|---|---|---|---|---|---|
| Amine number of the mixture of the TPU and of the starting materials | 4.67 | 4.67 | 4.67 | 2.34 | 1.17 |
| Amine number of the preparation | 4.67 | 4.67 | 4.67 | 2.34 | 1.17 |
| Water content of the mixture of the TPU and of all of the starting materials in % by weight | 0.01 | 0.1 | 0.18 | 0.18 | 0.18 |
| TPU 1 | 66.80 | 66.80 | 66.80 | 67.30 | 67.55 |
| Melamine cyanurate 15 ED | 24.80 | 24.80 | 24.80 | 24.80 | 24.80 |
| Fyrolflex RDP | 7.40 | 7.40 | 7.40 | 7.40 | 7.40 |
| Melamine | 1.00 | 1.00 | 1.00 | 0.50 | 0.25 |
| Phenol content [ppm by weight] of dried preparation | 40 | 44 | 118 | 58 | 18 |

It was shown that phenol contents greater than 10 ppm are determined with amine numbers >0.5. The phenol contents are also dependent on the water content of the mixture.

Example 10

Melamine

| Material (*= inventive) | 10* | 11 | 12 | 13 |
|---|---|---|---|---|
| Amine number of the mixture of the TPU and of the starting materials | 4.67 | 4.67 | 4.67 | 4.67 |
| Amine number of the preparation | 4.67 | 4.67 | 4.67 | 4.67 |
| Water content of the mixture of the TPU and of all of the starting materials in % by weight | 0.37 | 0.37 | 0.37 | 0.37 |
| TPU 1 | 84.00 | 54.00 | 49.00 | 69.00 |
| Melamine cyanurate 15 ED | 10.00 | 40.00 | 40.00 | 10.00 |
| Fyrolflex RDP | 5.00 | 5.00 | 10.00 | 20.00 |
| Melamine | 1.00 | 1.00 | 1.00 | 1.00 |
| Phenol content [ppm by weight] of the dried preparation | 86 | 113 | 189 | 240 |

It was shown that phenol contents greater than 10 ppm are determined with amine numbers >0.5. The phenol contents are also dependent on the quantity of the phosphoric ester.

Example 11

Cyanuric Acid

| Material (*= inventive) | 15* | 16* | 17* | 18* |
|---|---|---|---|---|
| Acid number of the mixture of the TPU and of the starting materials | 4.27 | 4.27 | 4.27 | 2.14 |
| Acid number of the preparation | 4.27 | 4.27 | 4.27 | 2.14 |
| Water content of the mixture of the TPU and of all of the starting materials in % by weight | 0.01 | 0.55 | 1.1 | 1.1 |
| TPU 1 | 66.80 | 66.80 | 66.80 | 67.30 |
| Melamine cyanurate 15 ED | 24.80 | 24.80 | 24.80 | 24.80 |
| Fyrolflex RDP | 7.40 | 7.40 | 7.40 | 7.40 |
| Cyanuric acid | 1.00 | 1.00 | 1.00 | 0.50 |
| Phenol content [ppm by weight] of the dried preparation | 10 | 11 | 17 | 17 |

It was shown that high acid numbers and water contents lead only to relatively small phenol contents.

Example 12

Cyanuric Acid

| Material (*= inventive) | 19* | 20* | 21* | 22* |
|---|---|---|---|---|
| Acid number of the mixture of the TPU and of the starting materials | 4.27 | 4.27 | 4.27 | 4.27 |
| Acid number of the preparation | 4.27 | 4.27 | 4.27 | 4.27 |
| Water content of the mixture of the TPU and of all of the starting materials in % by weight | 0.55 | 0.55 | 0.55 | 0.55 |
| TPU 1 | 84.00 | 54.00 | 49.00 | 69.00 |
| Melamine cyanurate 15 ED | 10.00 | 40.00 | 40.00 | 10.00 |
| Fyrolflex RDP | 5.00 | 5.00 | 10.00 | 20.00 |
| Cyanuric acid | 1.00 | 1.00 | 1.00 | 1.00 |
| Phenol content [ppm by weight] of the dried preparation | 7 | 7 | 14 | 19 |

It was shown that high acid numbers and water contents lead only to relatively small phenol contents.

Example 13

Calcium Hydroxide

| Material (*= inventive) | 23* | 24* | 25* |
|---|---|---|---|
| Amine number of the mixture of the TPU and of the starting materials | 14.4 | 7.2 | 3.6 |
| Amine number of the preparation | 14.4 | 7.2 | 3.6 |
| Water content of the mixture of the TPU and of all of the starting materials in % by weight | 0.66 | 0.66 | 0.66 |
| TPU 1 | 66.80 | 67.30 | 67.55 |
| Melamine cyanurate 15 ED | 24.80 | 24.80 | 24.80 |
| Fyrolflex RDP | 7.40 | 7.40 | 7.40 |
| Calcium hydroxide | 1.00 | 0.50 | 0.25 |
| Phenol content [ppm by weight] of the dried preparation | 98 | 91 | 78 |

It was shown that high amine numbers lead to high phenol contents.

Example 14

Citric Acid and p-Toluenesulfonic Acid

| Material (*= inventive) | 26* | 27* | 28* | 29* |
|---|---|---|---|---|
| Acid number of the mixture of the TPU and of the starting materials | 2.74 | 0.68 | 8.49 | 2.12 |
| Acid number of the preparation | 2.74 | 0.68 | 8.49 | 2.12 |
| Water content of the mixture of the TPU and of all of the starting materials in % by weight | 0.1 | 0.1 | 0.55 | 0.55 |
| TPU 1 | 66.80 | 67.55 | 66.80 | 67.55 |
| Melamine cyanurate 15 ED | 24.80 | 24.80 | 24.80 | 24.80 |
| Fyrolflex RDP | 7.40 | 7.40 | 7.40 | 7.40 |
| p-Toluenesulfonic acid | 1.00 | 0.25 | | |
| Citric acid | | | 1.00 | 0.25 |
| Phenol content [ppm by weight] of the dried preparation | 14 | 13 | 18 | 16 |

It was shown that high acid numbers and for thermoplastic polyurethanes very high water contents, i.e. >0.05% by weight lead only to relatively low phenol content increases in comparison with thermoplastic polyurethanes with high amine number and high water content.

Example 15

Determination of Weight-Average Molar Mass (Mw)

The sample is dissolved at 1% in (dimethylformamide+ 0.1% of dibutylamine) and then filtered by use of a 0.45 μm PTFE filter. The GPC parameters set were as follows:

Two GPC columns in series: PSS-Gel, 100 A; 5 μm, 300*8 mm; Jordi-Gel DVB, MixedBed, 5 μm; 250*10 mm; column temperature 60° C.; flow rate 1 mL/min; RI detector. Calibration here takes place with polymethyl methacrylate (EasyCal; PSS, Mainz), and dimethylformamide is used as eluent.

The evaluation to determine the weight-average molar mass is in accordance with, for example, Encyclopedic Dictionary of Polymers, volume 1, Jan W. Gooch, Springer, Nov. 6, 2010.

Example 16

Determination of Number-Average Molar Mass

The sample is dissolved at 1% in (dimethylformamide+ 0.1% of dibutylamine) and then filtered by use of a 0.45 μm PTFE filter. The GPC parameters set were as follows:

Four series-connected GPC columns: 2×PSS_SDV500 300*8 mm, 5 μm; PSS_SDV100, 300*8 mm, 5 μm; PSS_SDV50 300*8 mm, 5 μm; column temperature 35° C.; flow rate 1.5 mL/min; RI detector. The calibration method corresponds to the basis of the polyol: for PEG ethers, PEG calibrators are used; for PPG, PPG homologs; for PTHF ethers, homologs of PTHF; for adipate esters, homologs of polybutanediol adipate. For other polyols, the homologs of PMMA are used for calibration.

The evaluation to determine the number-average molar mass is in accordance with, for example, Encyclopedic Dictionary of Polymers, volume 1, Jan W. Gooch, Springer, Nov. 6, 2010.

The invention claimed is:

1. A preparation comprising:
   A) thermoplastic polyurethane produced at least from the following starting materials: (a) an isocyanate, (b) a substance which is reactive toward the isocyanate, optionally (c) a chain extender and optionally (d) a catalyst,
   B) as other starting materials (e) additional and/or auxiliary substances, which are either added to the thermoplastic polyurethane during the production process and thus are comprised in the thermoplastic polyurethane and/or are comprised in the preparation in addition to the thermoplastic polyurethane,
   wherein at least one of the starting materials comprises a phenoxy group or a derivative of the phenoxy group, wherein the phenoxy group or the derivative of the phenoxy group is present with bonding by way of an ester bond in a starting material,
   wherein the ester bond is part of an organic phosphate and/or of a phosphonate and the phenoxy group or the derivative of the phenoxy group is a constituent of the additional and/or auxiliary substance (e),
   wherein the phenol content of the preparation of the sum of the phenol contents of the thermoplastic polyurethane comprised in the preparation and of all of the other starting materials is less than 50 ppm by weight,
   wherein the additional and/or auxiliary substance (e) comprises melamine cyanurate, and the melamine cyanurate comprises an excess of melamine of less than 1% by weight, and
   wherein the total water content of all of the starting materials is less than 0.1% by weight, based on the total weight of all of the starting materials in the preparation, wherein the water content is determined in accordance with DIN EN ISO 15512 Method B,
   and wherein the base number of the preparation of the base number of the mixture of the thermoplastic polyurethane comprised in the preparation and of all of the starting materials present is smaller than 2.

2. The preparation according to claim 1, wherein the acid number of the preparation or the acid number of the mixture of the thermoplastic polyurethane comprised in the preparation and of all of the starting materials comprised in the preparation is smaller than 20.

3. The preparation according to claim 1, wherein the substance reactive toward the isocyanate is a polyether and/or a polycarbonate.

4. The preparation according to claim 3, wherein the polyether is polytetrahydrofuran (PTHF).

5. The preparation according to claim 4, wherein the number-average molar mass of the polytetrahydrofuran (PTHF) is from $0.5 \times 10^3$ g/mol to $5 \times 10^3$ g/mol.

6. The preparation according to claim 1, wherein the preparation comprises a polyester as the auxiliary substance and/or additional substance (e).

7. A composite, comprising the preparation according to claim 1, and a polyester.

8. A process for the production of the preparation according to claim 1, comprising processing the starting materials at a temperature of from 160° C. to 250° C. to give the preparation.

9. The process according to claim 8, wherein the sum of the phenol contents of the starting materials used is less than 50 ppm by weight, where the content is based on the total weight of all of the starting materials.

10. The process according to claim 9, wherein the content of phenol in the preparation immediately after the production process is less than 50 ppm by weight, where the content of phenol is based on the total weight of the preparation.

11. An extruded, powder-sintered, and/or injection-molded part produced from the preparation according to claim 1.

12. A composite material comprising the part of claim 11 and a polyester, wherein the part is in direct contact with the polyester.

13. The preparation according to claim 1, wherein said thermoplastic polyurethane has a Shore A hardness below 95.

* * * * *